United States Patent
Johnson (10) Patent No.: US 10,719,548 B2
(45) Date of Patent: Jul. 21, 2020

(54) METHOD FOR TERRITORIAL FILTERING, STREAMING, AND DOWNLOADING MEDIA FILES OVER A CLIENT-SERVER NETWORK WITH LOCAL READ-WRITE EXECUTION CAPABILITIES

(71) Applicant: Navarr Enterprises Inc., Saint Augustine, FL (US)

(72) Inventor: Lee Johnson, Saint Augustine, FL (US)

( * ) Notice: Subject to any disclaimer, the term of this patent is extended or adjusted under 35 U.S.C. 154(b) by 72 days.

(21) Appl. No.: 16/159,899

(22) Filed: Oct. 15, 2018

(65) Prior Publication Data

US 2020/0117719 A1    Apr. 16, 2020

(51) Int. Cl.
| | | |
|---|---|---|
| G06F 16/487 | (2019.01) | |
| G06F 16/14 | (2019.01) | |
| G06F 16/11 | (2019.01) | |
| G06F 16/17 | (2019.01) | |
| G06F 16/438 | (2019.01) | |

(52) U.S. Cl.
CPC .......... *G06F 16/487* (2019.01); *G06F 16/125* (2019.01); *G06F 16/14* (2019.01); *G06F 16/1734* (2019.01); *G06F 16/4387* (2019.01)

(58) Field of Classification Search
CPC ...... G06F 16/487; G06F 16/125; G06F 16/14; G06F 16/4387; G06F 16/1734
USPC .......................................................... 726/27
See application file for complete search history.

(56) References Cited

U.S. PATENT DOCUMENTS

| | | | |
|---|---|---|---|
| 6,253,237 B1 | 6/2001 | Story et al. | |
| 6,381,314 B1 | 4/2002 | Walinski | |
| 6,385,596 B1 | 5/2002 | Wiser et al. | |
| 6,434,621 B1 | 8/2002 | Pezzillo et al. | |
| 6,484,199 B2 | 11/2002 | Eyal | |
| 6,529,584 B1 | 3/2003 | Ravago et al. | |
| 6,611,813 B1 | 8/2003 | Bratton | |
| 7,020,710 B2 | 3/2006 | Weber et al. | |
| 7,073,191 B2 | 7/2006 | Srikantan et al. | |
| 7,509,178 B2 | 3/2009 | Logan et al. | |

(Continued)

FOREIGN PATENT DOCUMENTS

| | | |
|---|---|---|
| EP | 1617334 B1 | 6/2013 |
| MY | 164082 A | 11/2017 |

*Primary Examiner* — Khalil Naghdali
(74) *Attorney, Agent, or Firm* — Williams Intellectual Property; Benjamin F. Williams (57) ABSTRACT

A method for territorial filtering, streaming, and downloading media files over a client-server network with local read-write execution capabilities enables application of digital rights management data across batches of media files without admin having to alter each file, or metadata associated with each file, individually. Media files stored remotely in memory associated with a server are batch-handled for application of digital rights management data. Digital rights management data is applicable to batched files by assignation to particular directories wherein media files stored within a particular directory are associable with particular digital rights management data. Territorial filtering is applied to exclude media files from display as part of a selectable menu whereby users requesting access from certain locations are denied access to media files restricted from playback in that location. Media files transferred to user peripheral devices for offline playback are automatically deleted when an associated end time is clocked.

4 Claims, 8 Drawing Sheets

(56) References Cited

U.S. PATENT DOCUMENTS

| | | |
|---|---|---|
| 7,613,792 B2 | 11/2009 | Zervas et al. |
| 7,711,838 B1 | 5/2010 | Boulter et al. |
| 7,797,446 B2 | 9/2010 | Heller et al. |
| 7,930,720 B2 | 4/2011 | Holladay et al. |
| 7,937,450 B2 | 5/2011 | Janik |
| 8,046,811 B2 | 10/2011 | Sincaglia et al. |
| 8,307,123 B2 | 11/2012 | Dewa et al. |
| 8,996,421 B2 * | 3/2015 | Kahn .................. G06F 21/10 705/59 |
| 9,100,272 B1 | 8/2015 | Sullivan et al. |
| 9,268,775 B1 | 2/2016 | De Bonet et al. |
| 9,467,529 B2 | 10/2016 | Kikinis |
| 9,547,650 B2 | 1/2017 | Eyal et al. |
| 9,754,309 B2 | 9/2017 | Boulter et al. |
| 2001/0042109 A1 | 11/2001 | Bolas et al. |
| 2002/0010759 A1 | 1/2002 | Hitson et al. |
| 2006/0059095 A1 | 3/2006 | Akins, III et al. |
| 2008/0153413 A1 | 6/2008 | Li et al. |
| 2009/0049051 A1 * | 2/2009 | Horowitz ............ G06F 16/4387 |
| 2009/0198358 A1 * | 8/2009 | Logan .................. G06Q 30/06 700/94 |
| 2009/0298490 A9 | 12/2009 | Janik |
| 2011/0093622 A1 * | 4/2011 | Hahn .................. G06Q 30/06 710/13 |
| 2012/0222133 A1 * | 8/2012 | Kidron ................ G06F 15/167 726/28 |
| 2014/0074861 A1 * | 3/2014 | Bieschke ......... H04N 21/25833 707/748 |
| 2015/0186105 A1 | 7/2015 | Wellman et al. |

\* cited by examiner

METHOD FOR TERRITORIAL FILTERING, STREAMING, AND DOWNLOADING MEDIA FILES OVER A CLIENT-SERVER NETWORK WITH LOCAL READ-WRITE EXECUTION CAPABILITIES

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

COPYRIGHT NOTICE

Some portions of the disclosure of this patent document may contain material subject to copyright protection. The copyright owner has no objection to the facsimile reproduction by anyone of the patent document or ensuing disclosure as it appears on record at the Patent and Trademark Office, but otherwise reserves all copyright rights whatsoever.

BACKGROUND OF THE INVENTION

Various types of methods for streaming media over a client-server network are known in the prior art. However, what is needed is a method for territorial filtering, streaming, and downloading media files over a client-server network with local read-write execution capabilities that enables application of digital rights management data to batched media files stored remotely, whereby media files subject to territorial filtering, to determine playability in a particular locale designated by a point-of-origin data, may be withheld from display as part of a selectable menu for compilation by a user into a unique playlist.

The present method for territorial filtering, streaming, and downloading media files over a client-server network with local read-write execution capabilities further enables playback of a playlist transferred to a user peripheral device when said peripheral device is disconnected from the network. Time-of-download data encoded to the playlist at time of download enables articulation of an end time, measured from the time-of-download data, whereby the playlist will be automatically deleted from the peripheral device whether or not said peripheral device reconnects to the network subsequent to the initial download.

FIELD OF THE INVENTION

The present invention relates to a method for territorial filtering, streaming, and downloading media files over a client-server network with local read-write execution capabilities, and more particularly, to a method for territorial filtering, streaming, and downloading media files over a client-server network with local read-write execution capabilities that enables application of digital rights management data to batches of media files without having to alter each file, or metadata associated with each file, individually.

User access of a server from a user peripheral device instantiates a playlist prompt whereby point-of-origin data is communicated to the server. Point-of-origin data enables determination of the user peripheral device's geospatial location wherefrom the playback prompt was issued whereby territorial filtering, applied to remotely hosted media files, is effected to exclude media files identifiable as unlicensed for playback in the said location. Excluded media files are withheld from display as part of a selectable menu whereby an end user is not able to select geospatially restricted media files. The end user is thence enabled to compile a playlist from available media files, organized, sorted, and suggested by cross-correlating metadata associated with each of the media files.

Playlists may be created automatically, based on user historical data where no playlist is entered by the end user and an active playlist is about to expire while the peripheral device whereon the playlist is active and found to be running a dedicated software platform devised to enable batch transfer of media files, execution of the media files, and access to the selectable menu for playlist creation. Playlists are encoded with a time-of-download data to enable automated deletion when a scheduled end-time is clocked on the peripheral device, irrespective of whether the peripheral device is connected to the network.

GLOSSARY OF TERMS OF ART

The following terms of art are accorded the following meaning as used herein throughout in the following glossary of terms.

Playlist Prompt: A packet of data instantiated by a peripheral device running a dedicated software platform in connecting over a network to a server or other computing apparatus.

Point-of-Origin Data: Data articulated by the dedicated software platform derived from initial, local, and nearest Point-Of-Presence ("POP") accessible on the network whereby the location of the peripheral device is locatable in space and time.

Time-of-Download Data: Data recording the time a playlist is transferred from the server (or via the server) to the peripheral device for playback. Lease periods controllable through designated directories wherein associated media files are stored are calculated from the time-of-download data at transfer of the playlist to memory, whereby end-times culminating specific lease periods are articulated in order that media files comprising the playlist become deleted once the end-time is clocked upon the peripheral device.

Media File: Any executable file storable to memory that enables playback of streamable content operative over time, including video and audio files, whereby visual and/or audible content is playable through a peripheral device to an end user.

Digital Rights Management Data: Data assignable to directories or media files enabling control of use permissions, including enforcing geographical licensing restrictions and designated lease terms for use of media files written to memory upon a peripheral device.

Metadata: Data associable with a particular media file to enable cross-correlation, cataloguing, organizing, sorting, and display of related media files to which correlated metadata applies.

User Historical Data: All data corresponding to a history of use of media files through the dedicated software platform operative on a particular peripheral device, or devices, associated with a particular user identity and account. User historical data includes relevant metadata as well as generative data such as times a media file is played, times downloaded, and determination of which metadata predominates among media files associated with the user historical data.

Territorial Filtering: Cross-correlating media files via digital rights management data to exclude certain media files from a selectable menu generated and made accessible to users of particular point-of-origin data.

Playlist: Transferable, rewritable slots in a container to which digital rights data is assignable, whereby media files are writable into each slot to comprise the container and batched handling and transfer of the media files is thereby enabled as part of a protocol effectuated by the dedicated software platform.

SUMMARY OF THE INVENTION

The present method for territorial filtering, streaming, and downloading media files over a client-server network with local read-write execution capabilities has been devised to enable assignment of digital rights management data to batched media files and thereby control playback of media files per geographic region. Media files ineligible for playback in a particular location, country, or region, will be excluded from a selectable menu displayed when a user operating a peripheral device in said location, country, or region, is presented the menu to select media files for assemblage into a unique playlist.

When a user accesses a server to create a playlist by executing a dedicated software platform upon a peripheral device, the user peripheral device issues a point-of-origin data as part of a playlist prompt. Point-of-origin data includes uniquely identifying characteristics whereby the location of the user peripheral device in space and time is determinable. Virtual Private Networks and onion routers are automatically disabled, or overrun, upon the peripheral device by the dedicated software platform when executed. Anonymity or onion routing is therefore preventable previous to accessing the server and the point-of-origin data is determinable from discovery of the local or initial Point Of Presence ("POP") on the network relative to the peripheral device.

The server side is associated with memory whereat a plurality of media files is storable in designated directories. The server communicates with a remote database to generate a selectable menu of available media files for batch transfer and playback upon the user peripheral device. Media files are subject to territorial filtering previous to display as part of the selectable menu whereby media files unlicensed for playback in the particular location corresponding to the point-of-origin data are excluded from display. Territorial filtering is effected by action of digital rights management data that is assignable to designated directories to control access to and playability of associated media files stored, written, or associated within a specific designated directory.

Once media files are selected and a unique playlist is generated, the associated media files are prepared for batch transfer to the peripheral device, either into short term memory (for streaming playback connected to the network) and/or to long term memory for playback disconnected from the network at a later time. Media files are transferred prioritized by sequence in the playlist proper, whereby initial media files are transferred first so that playback can begin almost immediately—the initial media file is executable even before the entire file has transferred. Media files comprising the playlist continue to download as the playlist is played. Media files comprising the playlist are therefore downloaded to short term memory during streaming of the playlist, whereby interruption is prevented even where the network fails or connection drops within a buffered timeframe. Media files comprising the playlist are likewise stored to long term memory for local playback at a later time, when desired.

Time-of-download data is encoded into the playlist whereby an end-time is articulated to effect automated deletion of the playlist, or particular files comprising the playlist, when the end-time is clocked by the peripheral device. Where a particular media file's end-time precedes that of the playlist as a whole, that media file is deleted and subsequent media files are executed in sequence.

End-times are assignable by an admin in the server or database wherein the digital rights management data is associated. End-times may be calculated as a lease period (e.g. 28 days) initiated at the peripheral device by corresponding time-of-download data. Thus, particular lease terms are readily controllable by admins by setting end-times to batched media files. Lease terms are therefore merged into the playlist and transferred to the peripheral device associated with each media file comprising the playlist. The dedicated software platform running the process therefore integrates the lease term for each media file comprising the playlist at time of receipt and effectuates deletion of the media files when the local peripheral device clocks the end-time as calculated by addition to the time-of-download data.

Objects of the present method for territorial filtering, streaming, and downloading media files over a client-server network with local read-write execution capabilities, along with various novel features that characterize the invention are particularly pointed out in the claims forming a part of this disclosure. For better understanding of the method for territorial filtering, streaming, and downloading media files over a client-server network with local read-write execution capabilities, its operating advantages and specific objects attained by its uses, refer to the accompanying drawings and description.

BRIEF DESCRIPTION OF THE DRAWINGS

Figures

DETAILED DESCRIPTION OF THE DRAWINGS

With reference now to the drawings, and in particular FIGS. 1 through 8 thereof, example of the instant method for territorial filtering, streaming, and downloading media files over a client-server network with local read-write execution capabilities employing the principles and concepts of the present method for territorial filtering, streaming, and downloading media files over a client-server network with local read-write execution capabilities and generally designated by the reference number 10 will be described.

Referring to FIGS. 1 through 8 a preferred embodiment of the present method for territorial filtering, streaming, and downloading media files over a client-server network with local read-write execution capabilities 10 is illustrated.

The present method contemplates streaming and downloading media files 32 over a client-server network 12 wherein said media files 32 are first subjected to territorial filtering 50 to ensure playability upon a peripheral device 100 discovered to be operating in a location determined by point-of-origin data 24 from whence a playlist prompt 22 is issued. The playlist prompt 22 originates when a user logs onto a server 30 to browse displayed media files 32. Upon receipt of the playlist prompt 22, the server 30 instantiates a query to a networked database 40 to thereby determine digital rights management data 34 pertaining to the media files 32 relative to the locale corresponding to the point-of-origin data 24. Only media files 32 that are determined to be playable in the locale corresponding to the point-of-origin data 24 will be displayed for selection by the end user seeking to create a unique playlist 102 for streaming or download upon the user's peripheral device 100.

A user is thence enabled to select media files 32 from a displayed selectable menu 70 to create the playlist 102 which is then executable on the user peripheral device 100 when said peripheral device 100 runs a dedicated software platform. The media files 32 are merged into the playlist 102 and prepared for batch transfer. The server 30 prioritizes media files 32 for transfer ranked by sequence of the particular media files 32 pursuant to a slot in the playlist 102. Thus files occupying earlier slots for playback in the playlist 102 are transferred first—either to short-term memory on the peripheral device 100 (such as executable for streaming) or more long-term memory for playback disconnected from the network 12. Thus playback of the media files 34 occupying the initial slot in the playlist 102 is commenced immediately to allow for rapid play of the playlist 102. Remaining media files 32 are downloadable simultaneously.

When media files 32 are downloaded to more long-term memory for playback disconnected from the network 12, and executed on the user peripheral device 100, the playlist 102 is downloaded with a date-of-download data 26 sequence attached therein whereby an automated deletion of the playlist 102 from the local device is effectuated at a preprogrammed end time.

Figure 1:
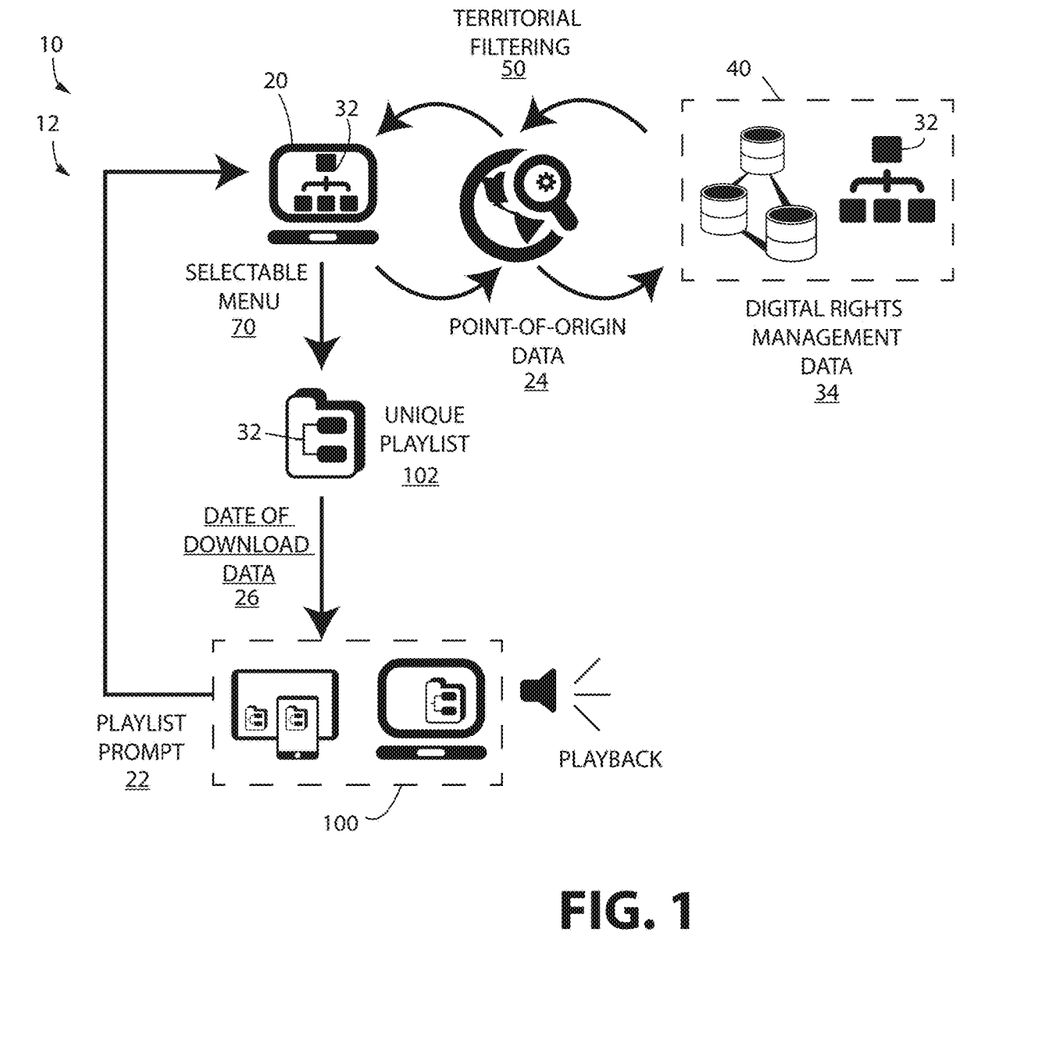
FIG. 1 is a flow diagram of an example embodiment of the instant method, showing a client-server network and the creation and exchange of a playlist after application of territorial filtering to determine digital rights management for a discovered point-of-origin data.

As illustrated in FIG. 1, a server 20 is connected over a network 12 with a database 30 storing medial files 32 and digital rights management data 34 associable with each of the media files 32. A playlist prompt 22 is received by the server 20, instantiated when a user peripheral device 100 logs onto the server 20. The playlist prompt 22 includes a point-of-origin data 24 whereby the location of the peripheral device 100 (collectively illustrated as a computer, a tablet, and/or a cellular telephone in FIG. 1) is determinable. Territorial filtering 50 is then initiated to order media files 32 and screen out media files 32 from display that are restricted by associated digital rights management data 34 from playback in the specific location of the peripheral device 100 corresponding to the point-of-origin data 24. Thus only media files 32 with digital rights management data 34 supportive of playback in the user's location will be displayed as part of a selectable menu 70 for user creation of a unique playlist 102.

Media files 32 are then displayed as part of a user selectable menu 70, said media files 32 ordered by correlating metadata 36 associated with each media file 32, such as "genre", "artist", "album", "voice", and other such metadata 36 associable with media files 32 that enable cogent classification for cataloguing, sorting, and display (see Table 1 below). User browsing history, including reference to previously ordered and downloaded and/or streamed playlists, is likewise considered in ordering media files 32 for selectable display by correlation with user historical data 38.

TABLE 1

| Metadata | |
| --- | --- |
| Genre | Mood |
| Subgenre | Album |
| Artist | Key |
| Composer | Voice |
| Tempo | Pitch |
| BPM | Style |
| Duration | User historical data |

Figure 2:
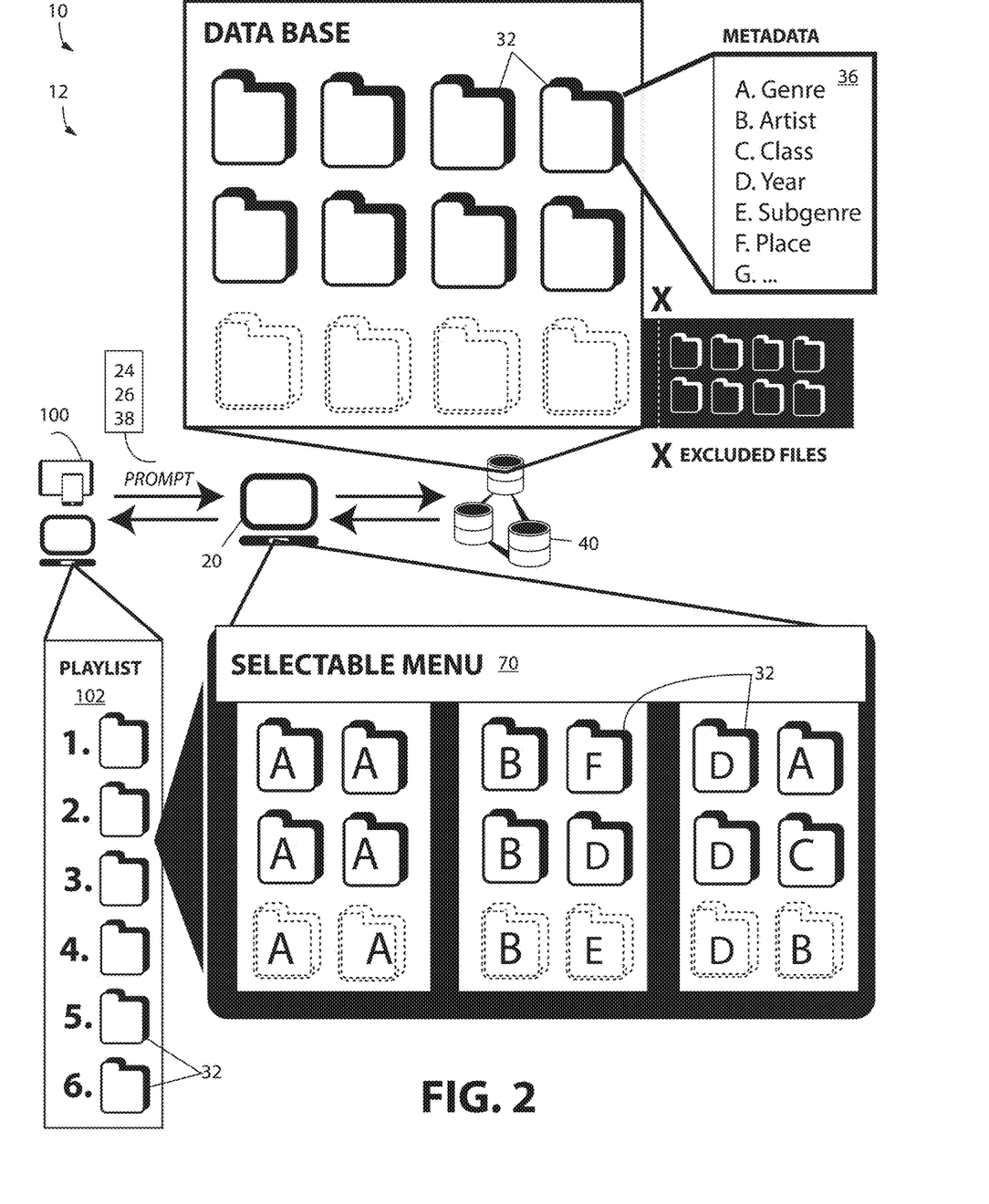
FIG. 2 is a diagrammatic view illustrating an example embodiment of the assignment of digital rights management data to exclude restricted media files from a displayed selectable menu as well as organization of the selectable menu for display of media files based on metadata parameters correlating media files.

As shown in FIG. 2, media files 32 may be stored in memory associated with the server 20 (such as on a networked database 40, for example). Metadata 36 associated with media files 32 is usable to organize media files 32 into selectable menus 70 individualized for particular end users. User historical data 38 (such as correlations of metadata associated with media files 32 selected onto a particular peripheral device 100) may likewise enable individualized display of the selectable menu 70 whereby media files 32 correlated with metadata 36 of previously selected files may appear dominant in the selectable menu 70 (such as near the top of the menu, for example, or in a relevant sidebar, or otherwise rendered visually prominent for selection). The selectable menu 70 may also enable a user to search the store of media files 32 by query, genre, artist, or other metadata 36, executed via the server 30.

Figure 3:
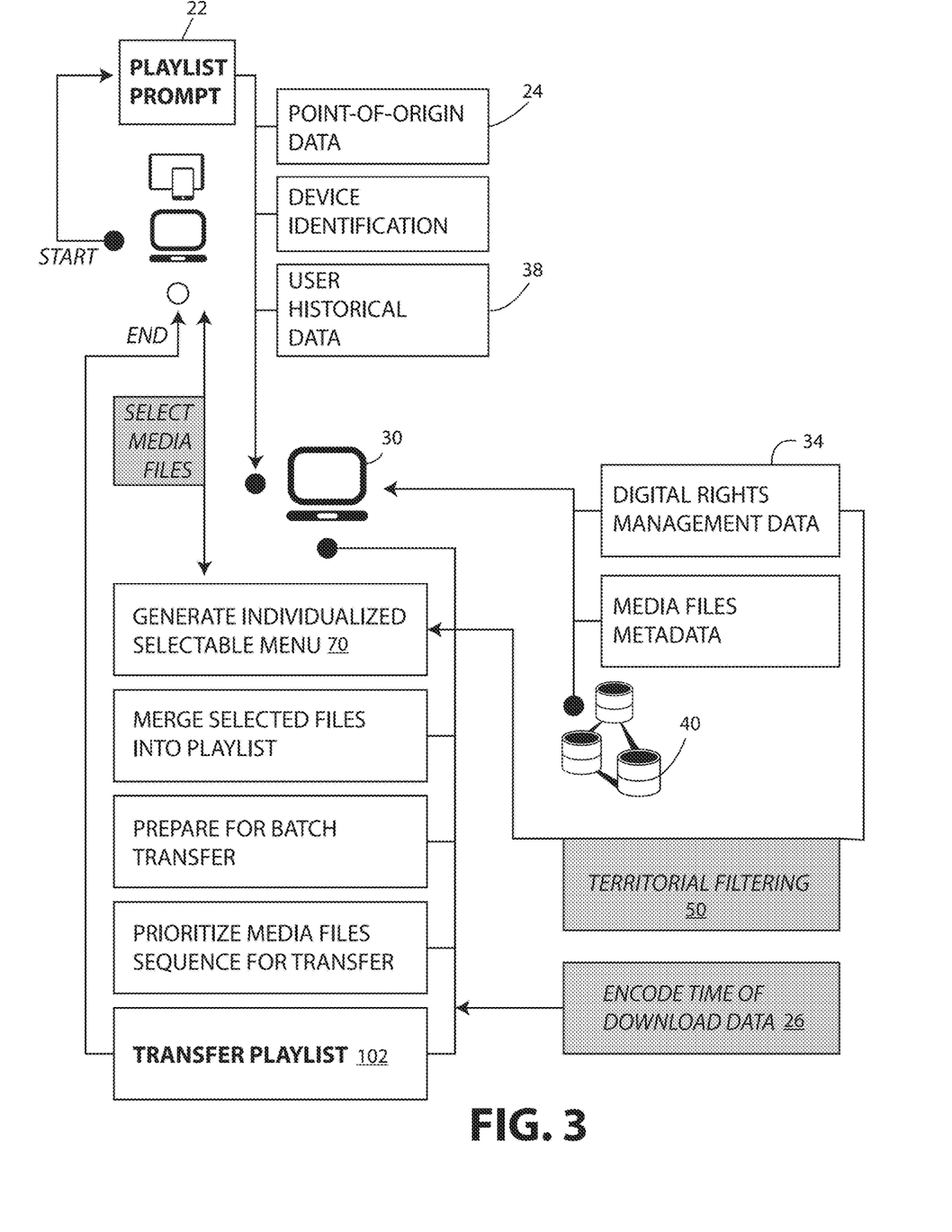
FIG. 3 is a flow diagram illustrating an example embodiment of generating a playlist for transfer over the instant client-server network.

As shown in FIG. 3, once the playlist prompt 22 is received by the server 30, the individualized selectable menu 70 is generated. Selected media files 32 are thence merged into the playlist 102. The media files 32 are then batch transferred as part of the playlist 102 for either streaming on the peripheral device 100 or download to the peripheral device 100. The media files 32 comprising the playlist 102 are prioritized by sequence for download to maximize efficiency of file transfer over the network 12 and enable immediate playback of the initial file downloaded, even while the playlist 102 continues to download to either short term or long term memory. Whenever media files 32 are downloaded to the peripheral device 100, time-of-download data 26 is encoded into the playlist 102 and transferred along with the media files 32. Time-of-download data 26 includes an end time 28 scheduled by the digital rights management data 34 whereby the media files 32 are deleted from the peripheral device 100 when the end time 28 is clocked whether or not the peripheral device 100 reconnects to network 12.

Figure 4:
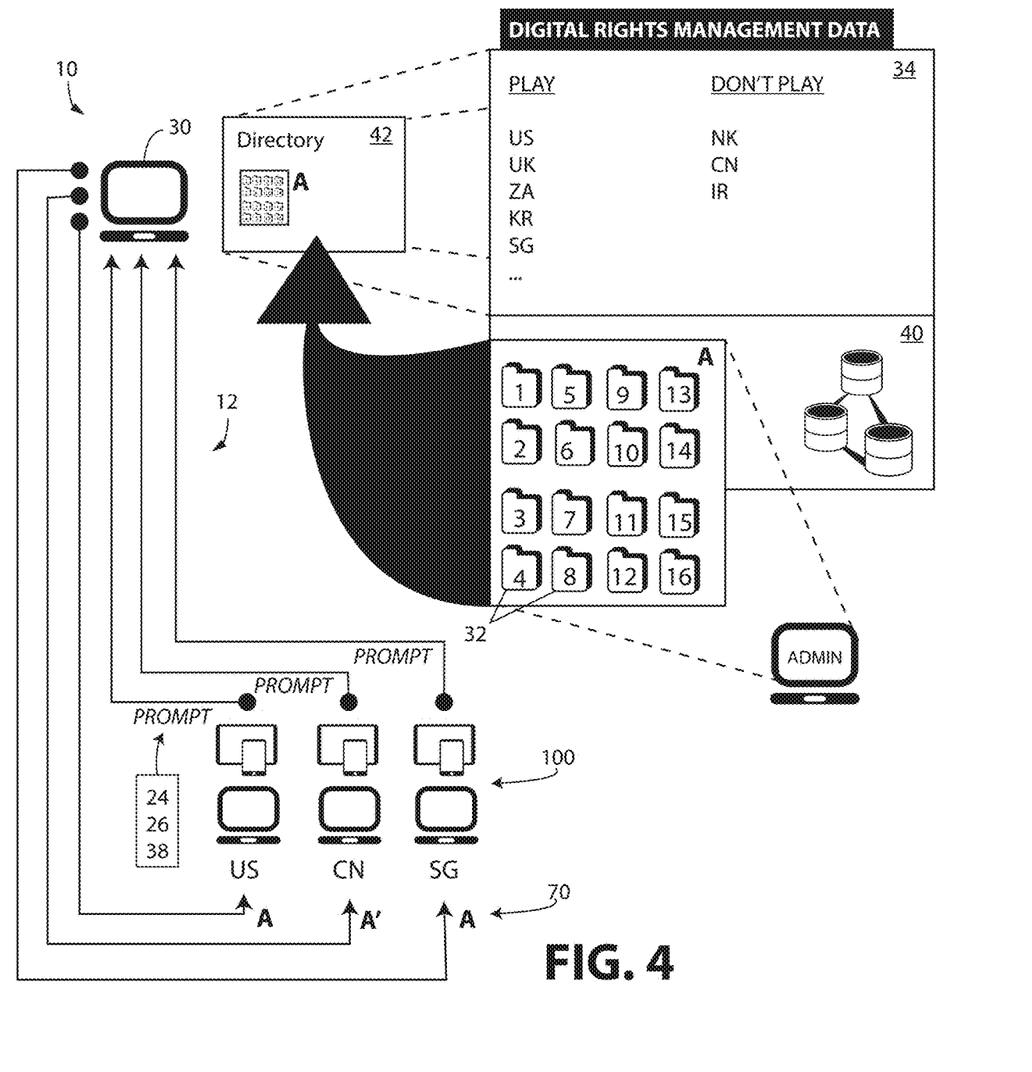
FIG. 4 is a diagrammatic view illustrating an example embodiment of admin control of digital rights management data applied to and affecting batched media files to expediently alter territorial filtering and exclusion of media files from display of the selectable menu based on point-of-origin data whereby different selectable menus are generated for end users based on the user location as determined from the point-of-origin data.

Thus, as shown in FIG. 4, control of the digital rights management data 34 strictly controls playback of specific media files 32, by location and in time, without an administrator having to alter additional data (such as the media files themselves or associated metadata). A change rendered to the digital rights management data 34 may affect playback of all media files 32 in a given area or over a given timeframe. Access to a simple table of digital rights management data 34 stored in a particular directory 42 whence the server 30 query is directed therefore enables an administrator to update digital rights management data 34 (to exclude a particular country or region, for example, executed during territorial filtering 50) or to shorten a term wherein a specific media file 34 may be played previous to its automatic deletion from a streamed playlist 102 or from memory when the playlist 102 is downloaded to memory in the peripheral device 100.

In the example illustrated in FIG. 4, unique media files 34 are assigned digital rights management data 34 by position within a directory 42 wherein a macro setting is instantiated to exclude the media files 32 from certain countries (NK, CN, and IR in the example illustrated). Thus media files 1 through 16 (as illustrated and collectively identified as A) will be excluded from any selectable menu 70 displayed upon a peripheral device 100 instantiating a point-of-origin data 24 from NK, CN, or IR. As shown in the FIG. 4, the selectable menu 70 accessible to the end user in CN views a selectable menu A'; that is, a menu excluding the group of media files illustrated as A which are yet displayable and selectable to end users prompting point-of-origin data 24 from the US and SG, as illustrated.

To set territorial filtering 50 to exclude media files 1 through 16, an administrator simply places those files 1 through 16 into a directory 42 wherein the digital rights management data 34 applies. An administrator can therefore control where media files 32 are played by writing media files 32 to a specified directory or by modifying the digital rights management data 34 that already applies to a specific directory. For example, in FIG. 4, the administrator could add another country code to the "Don't Play" column and thereby automate exclusion of the files 32 associated with the directory 42 to not display in selectable menus 70 generated for users in that country added to the "Don't Play" column. Alternately, an administrator could move a particular media file 32 from the directory 42 and write it to another directory to which alternate digital rights management data 34 is applied. An administrator is therefore enabled application of digital rights management data 34 to handle playback of even large quantities of media files 32 across various designated market areas with relative ease and expedience.

Figure 5:
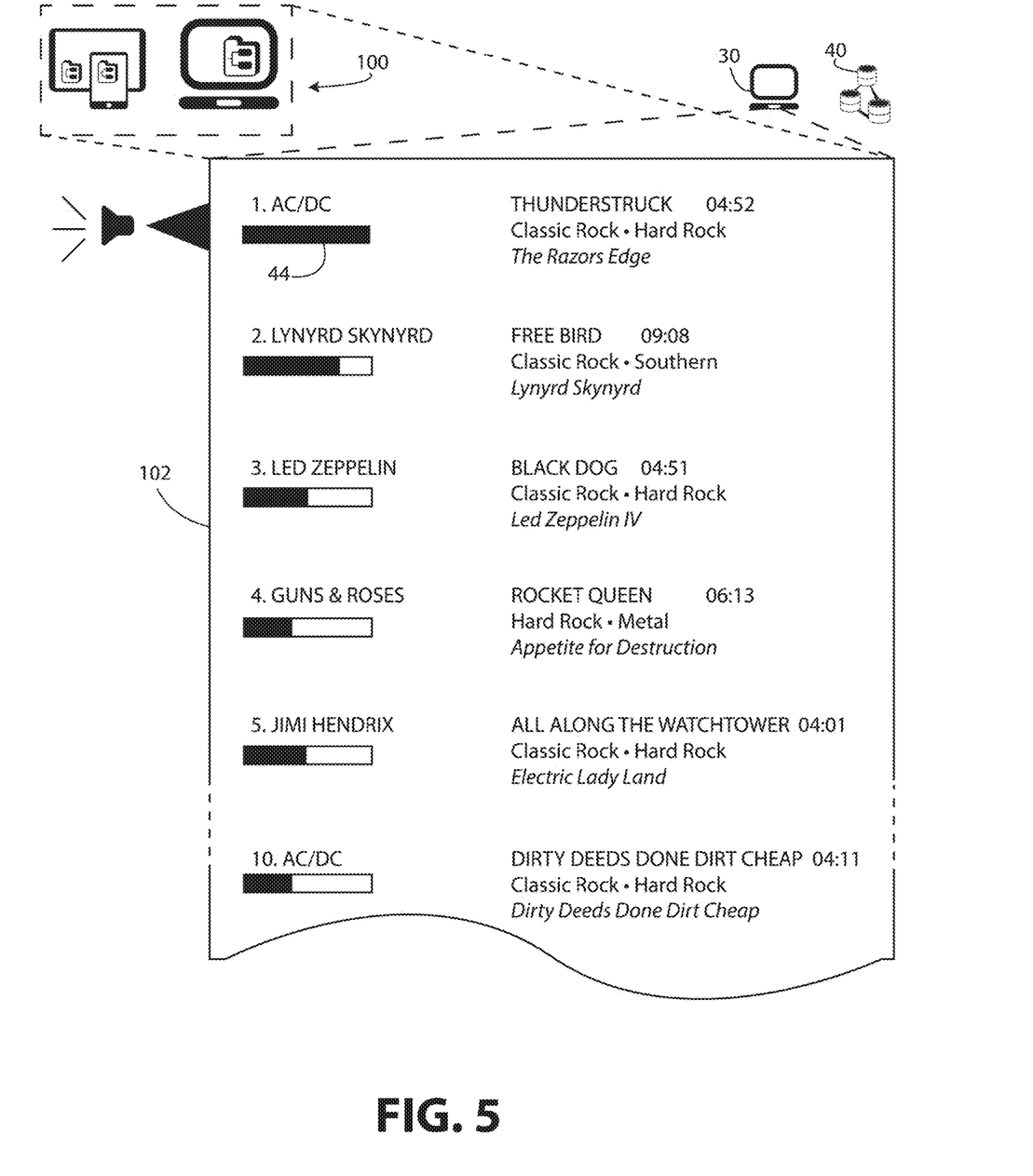
FIG. 5 is a diagrammatic view illustrating an example embodiment of prioritized transfer of media files comprising a playlist. Each media file is downloaded by priority relative each said media file's position in the playlist. Buffering of media files enables near immediate playback of the initial media file during transfer.

FIG. 5 illustrates a playlist undergoing download to either short term (for streaming) or long term memory (for playback disconnected from the network) on a user peripheral device 100. Prioritized transfer applies to media files 32 based on sequence in the batch transfer. Thus the first file ("Thunderstruck") is playable as soon as substantially downloaded (optimized by the average buffer rate at time of transfer) whereby playback is initiated immediately. Download status (proportion of data downloaded for each media file 32) is illustrated by the download bar 44 shown underneath each file title comprising the playlist 102, wherein the black portion illustrates the quantity of the relevant file data downloaded and the unfilled portion of the download bar 44 illustrates that portion of the file 32 still remaining to download. Downloading files are buffered during playback to enable immediate playback without disturbance as data is transferred leading the point of playback maintained in running the media file. Thus while the first track plays, and continues to download, additional media files comprising the playlist are simultaneously downloaded and spooled for playback, with priority given to the immediately ensuing slot.

Figure 6:
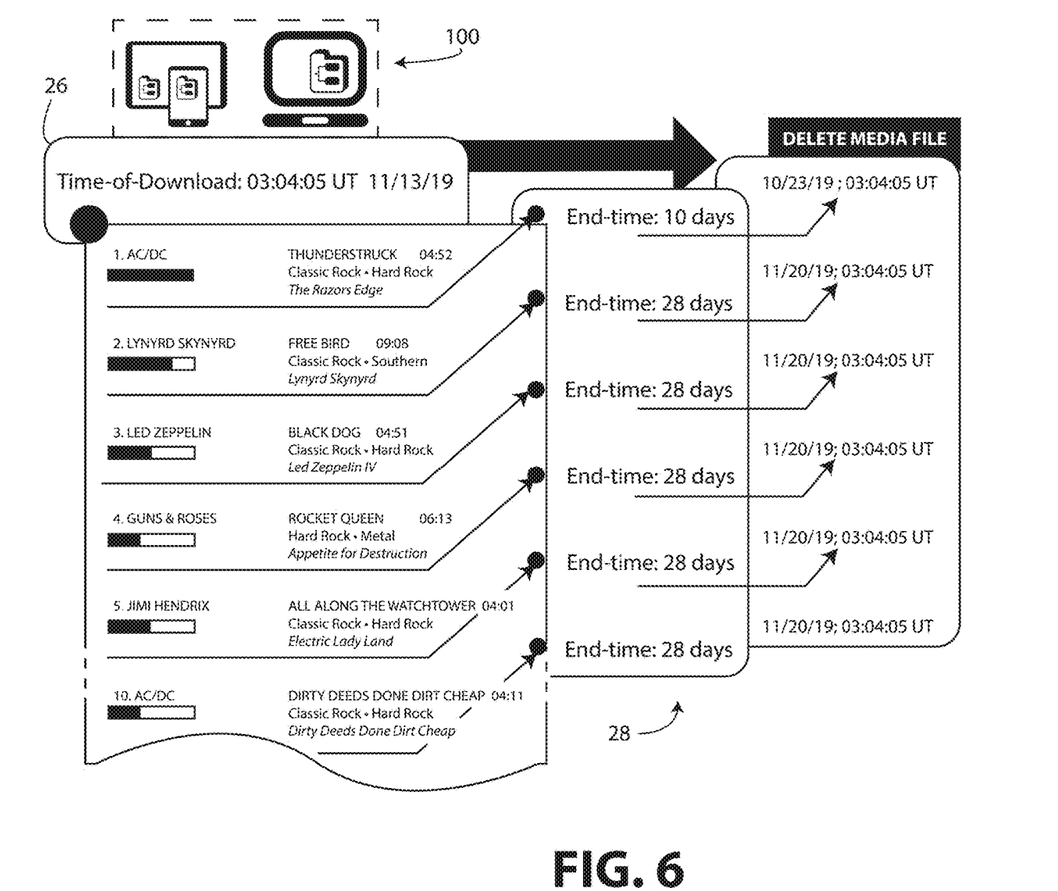
FIG. 6 is a diagrammatic view illustrating addition of time-of-download data to media files comprising the playlist whereby end times are calculable on the local, peripheral device to automate deletion of files at the end of a set lease term.

FIG. 6 illustrates inclusion of time-of-download data 26 associated with each relevant media file 32 comprising a transferable playlist 102 whereby the time-of-download data 26 effects automated deletion of each media file 32 according to a lease term defined when the peripheral device 100 clocks an associated end time 28. The particular end time 28 for each media file 32 is controllable by the digital rights management data 34 whereby an update to a particular directory 42 wherein various media files 32 are stored, associates a lease period with all the media files 32 stored within that directory. Thus extraction of files 32 for writing to a playlist 102 pulls the end time 28 for merger into the playlist 102. Addition of the end time 28 to the time-of-download data 26 creates the lease period active on the local, peripheral device 100. Thus, irrespective of whether the peripheral device 100 reconnects to the network 12, the lease period is enforced and media files 32 in any particular playlist 102 are deleted automatically when the end time 28 is clocked.

Figure 7:
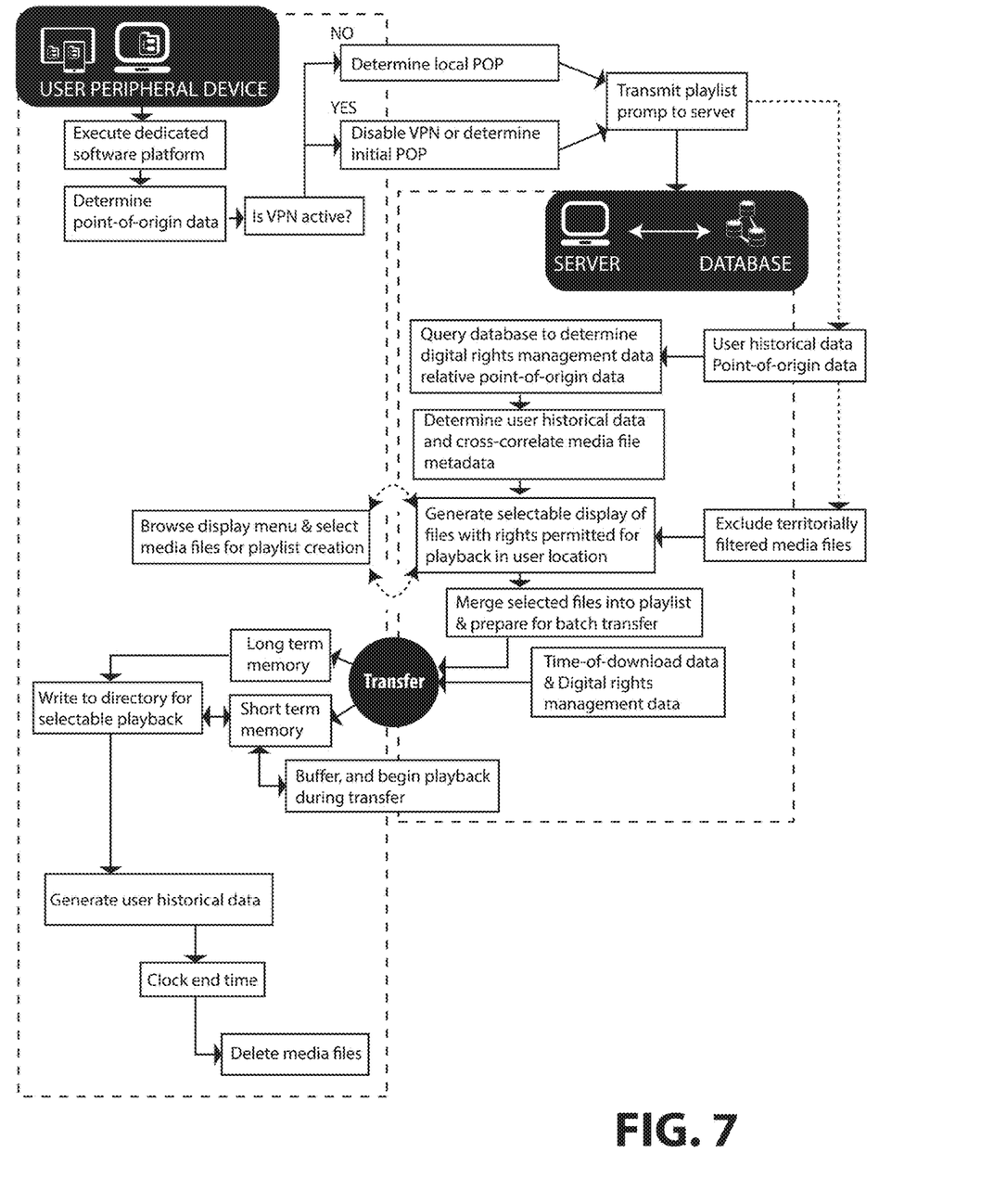
FIG. 7 is a flow diagram illustrating a summary view of an example embodiment of the method for streaming media over the client-server network with local read-write execution capabilities maintained.

FIG. 7 illustrates a step-by-step flow diagram illustrating the steps described above, comprising the process by which the present method for territorial filtering, streaming, and downloading media files over a client-server network with local read-write execution capabilities is executable. FIG. 7 therefore illustrates the overall process by which the instant method operates.

Figure 8:
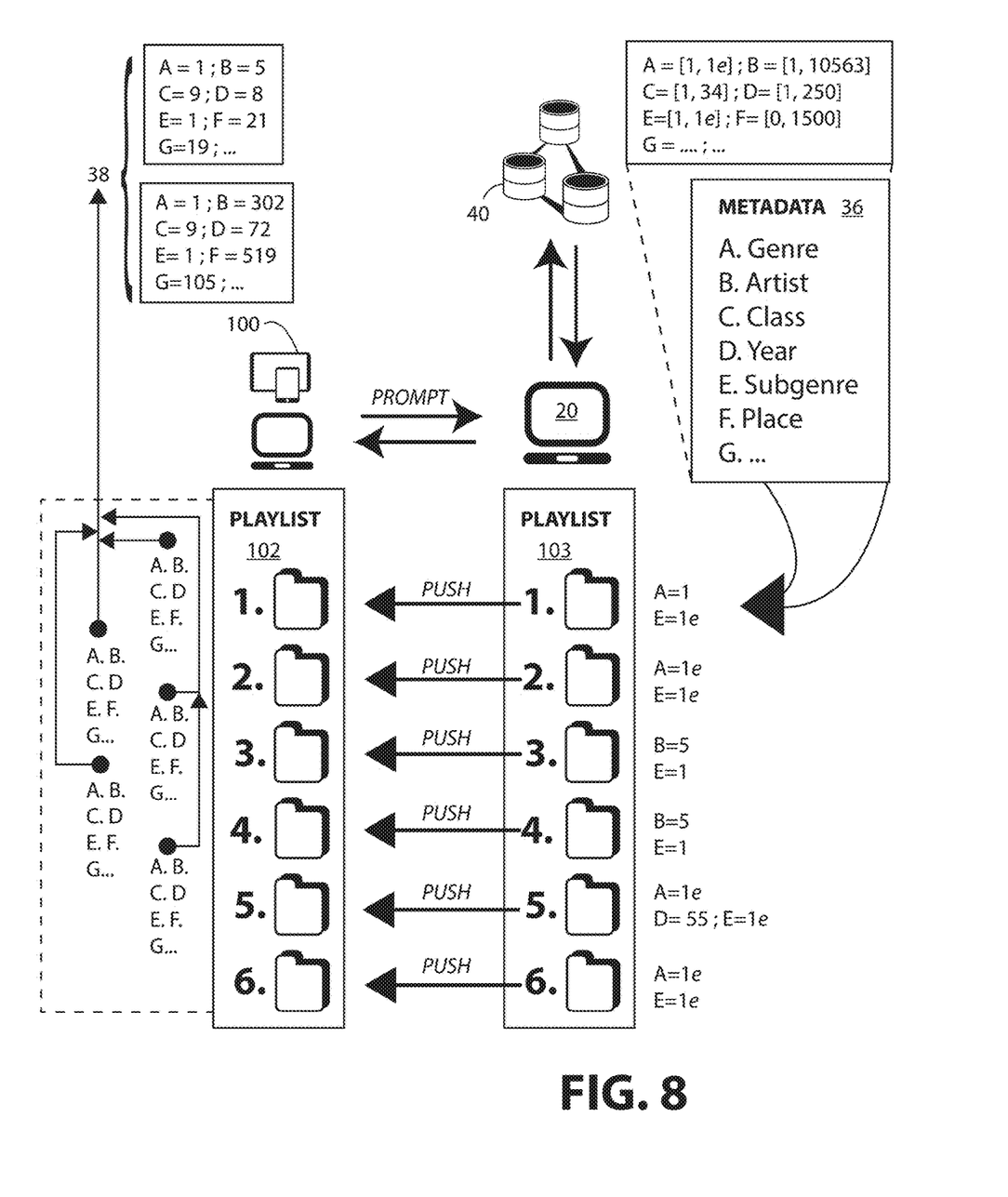
FIG. 8 is a diagrammatic view of an example embodiment of automatically generating a playlist for continued playback upon a user peripheral device when a new playlist is not selected by the user.

FIG. 8 illustrates automated generation of a new playlist 103 for continued playback of media files when a user fails to manually select media files to generate a new playlist 103. User historical data 38, generated from previous playlists transferred and executed, is reported back to the server 20. Metadata 36 values comprising the user historical data 38 enables automated selection of media files 32 with matched metadata 36 values. For example, as shown in FIG. 8, a "genre" of A=1 (a particular genre of music associated with the value 1 in this example) comprises a selection of user historical data 38. Media files 32 are then selectable based on matches within that value (A=1) or within a set range of variation, for example, A=1e, wherein 1e is a matched range for the particular value. In the present example of "genre", the values could be 1="rock", say, and e="one value deviation"; thus "rock" is matchable with genres "hard rock" and "blues", for example, where the deviation e applies to the specific range of variation applicable across genres as set an controlled by admin. Media files are then selected matched to values generated in the user historical data and pushed into the new playlist so that uninterrupted playback continues. A user is enabled to reset their playlist by simply logging onto the server and reselecting new media files as desired. Further, user preferences may be set in the user account such that particular metadata values are prioritized over others (such as genre, year, location, etc.). Users are further enabled to provide feedback (such as up-valuing a media file by denoting a positive value associated with the media file or alternately down-valuing a media file by denoting a negative value associated with the media file) whereby said feedback further articulates user historical data.

Metadata values are then articulated to associate media files for merger into the new playlist 103 for automated playback in the absence of user intervention. User historical data 38 further includes times wherein each media file was played whereby the new playlist 103 will not include media files executed in the immediately preceding playlist 102 nor media files executed within a determined and settable timeframe.

What is claimed is:

1. In a server comprising non-transient computer readable medium connected over a network, a method for territorial filtering, streaming, and downloading media files over a client-server network with local read-write execution capabilities, said method comprising steps of:

storing media files to memory associated with the server, said media files associable with digital rights management data stored and accessible via communication with an interconnected database;

organizing media files by matching metadata associated with each file, whereby media files are displayable grouped based on matched metadata characteristics;

displaying media files for selection into a playlist only in response to receipt of a playlist prompt, said playlist prompt received over the network from at least one client peripheral device operating at a designated point-of-origin and running a dedicated software platform enabling a transfer protocol between the server and the at least one client peripheral device whereby transfer and playback of media files comprising the playlist on the client peripheral device is substantiated;

excluding specific media files from display as part of a selectable menu presented for user selection when said specific media files are found to be restricted from playback within a specific geographic location wherein the point-of-origin of the at least one client peripheral device is determined, whereby said specific media files are not displayed as part of the selectable menu for user selection in creating the playlist;

displaying all other media files stored to memory associated with the server for user selection into the playlist;

upon decision by the client peripheral device, extracting user selected media files to merge into the playlist;

merging selected media files into the playlist for batched transfer over the client-server network to the at least one client peripheral device;

verifying playability of each media file comprising the playlist, said playability determined against the specific geographic location of the point-of-origin whence the playlist prompt issued, by query to the database to determine the digital rights management data associated with each media file pertinent to the specific geographic location pursuant to the point-of-origin;

denying access to all media files restricted from playability in each specific geographic location where controlled via the digital rights management data;

permitting access to all media files not restricted from playability in each of the specific geographic locations as controlled via the digital rights management data;

executing the batched transfer in response to the playlist prompt when confirmation of transfer is received over the network from the designated point-of-origin;

executing the protocol to enable download of the playlist to the at least one client peripheral device running the software platform enabling the protocol;

executing the protocol to enable streaming of the playlist to the at least one client peripheral device running the software platform enabling the protocol;

encoding time-of-download data into the requested playlist when downloaded to the at least one client peripheral device running the software platform enabling the protocol; and deleting the playlist from the at least one client peripheral device when an end time is clocked, said end time articulated relative to the time-of-download data irrespective of whether the at least one client device is reconnected to the network subsequent downloading the playlist;

wherein streaming and execution of media files selected over network to comprise a user-generated playlist is controllable by digital rights management data associable to specific geographic locations and determinable by the point-of-origin of a playlist prompt request issued by at least one client device.

2. In the server of claim 1, the method further comprising the step of optimizing playback of the playlist on the at least one client device by prioritizing download of the media files based on each file's position in the playlist whereby streamed playback is enabled during download of each file of the playlist.

3. In the server of claim 2, the method further comprising the step of organizing client created playlists into novel playlist categories by:

collating all metadata associated with each media file comprising the playlist;

matching values extracted from the metadata; and extrapolating trends from the matched values for substitution of media files as a displayed suggested playlist to the at least one client device.

4. In the server claim 3, the method further comprising the step of generating a proxy playlist for automated download or streaming after the playlist has played and in the absence of a user configured subsequent playlist, said proxy playlist generable from determinable trends matched via extrapolating media file metadata.

* * * * *